United States Patent [19]
Aoki et al.

[11] Patent Number: 5,734,633
[45] Date of Patent: Mar. 31, 1998

[54] OPTICAL-DISK RECORDING AND REPRODUCING APPARATUS AND METHOD USING AN OPTICAL DISK FOR RECORDING INFORMATION ON LANDS AND GROOVES

[75] Inventors: Kazuhiro Aoki, Suita; Motoshi Ito, Moriguchi; Shunji Oohara, Higashiosaka, all of Japan

[73] Assignee: Matsushita Electric Industrial Co., Ltd., Osaka, Japan

[21] Appl. No.: 757,020

[22] Filed: Nov. 26, 1996

Related U.S. Application Data

[62] Division of Ser. No. 299,606, Sep. 1, 1994.

[30] Foreign Application Priority Data

Sep. 16, 1993 [JP] Japan .................................. 5-230074

[51] Int. Cl.$^6$ .................................................. G11B 7/095
[52] U.S. Cl. .................................. 369/44.26; 369/44.28; 369/54; 369/111
[58] Field of Search ........................ 369/13, 32, 44.26, 369/44.28, 47–48, 50, 54, 58, 111, 275.3–275.4

[56] References Cited

U.S. PATENT DOCUMENTS

| | | | |
|---|---|---|---|
| 4,947,384 | 8/1990 | Suzuki et al. | 369/111 X |
| 5,101,391 | 3/1992 | Ishii et al. | 369/58 X |
| 5,124,962 | 6/1992 | Haneji | 369/32 |
| 5,448,552 | 9/1995 | Onagi | 369/275.4 |
| 5,452,272 | 9/1995 | Murakami et al. | 369/13 |
| 5,477,526 | 12/1995 | Inoue | 369/275.4 |

OTHER PUBLICATIONS

Miyagawa et al., "Improvement of track density by land and groove recording on phase change optical disk", Extended Abstracts (The 40th Spring Meeting, 1993); The Japan Society of Applied Physics and Related Societies, May 1993.

Ohno et al., "Investigation of Land & Groove Recording Method on Phase Change Optical Disks", Extended Abstracts (The 40th Spring Meeting, 1993); The Japan Society of Applied Physics and Related Societies, May 1993.

Ogami et al., "Optical Disk Technique", Recording Fromat, pp. 222–223.

*Primary Examiner*—W. R. Young
*Attorney, Agent, or Firm*—Ratner & Prestia

[57] ABSTRACT

The optical-disk recording and reproducing apparatus is provided with an optical head, a reproduction circuit, a detector circuit, a servo circuit, a recording circuit, and a controller. The controller among them performs such control that information is recorded and reproduced on only either lands or grooves in a region where file management information is recorded and reproduced, while information is recorded and reproduced on both lands and grooves for a plurality of tracks or for every zone in a data region, in the case of a land and groove recording optical disk. In the case of a land or groove recording optical disk, the controller performs such control that information is recorded and reproduced at alternate tracks in a region where file management information is recorded and reproduced, while information is continuously recorded and reproduced in the data region. As an optical disk, the track pitch in the region where the file management information is recorded and reproduced is made wider than the diameter of the laser beam.

8 Claims, 16 Drawing Sheets

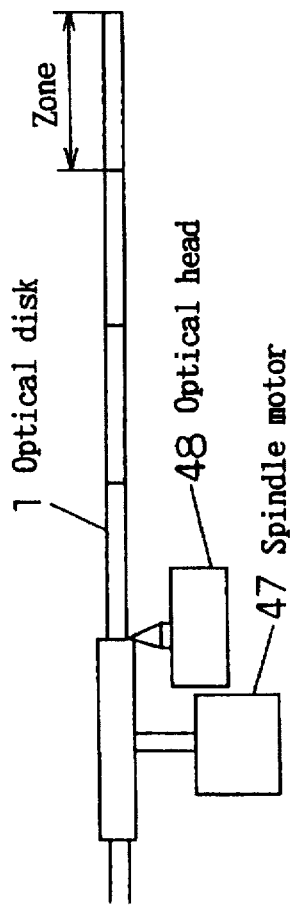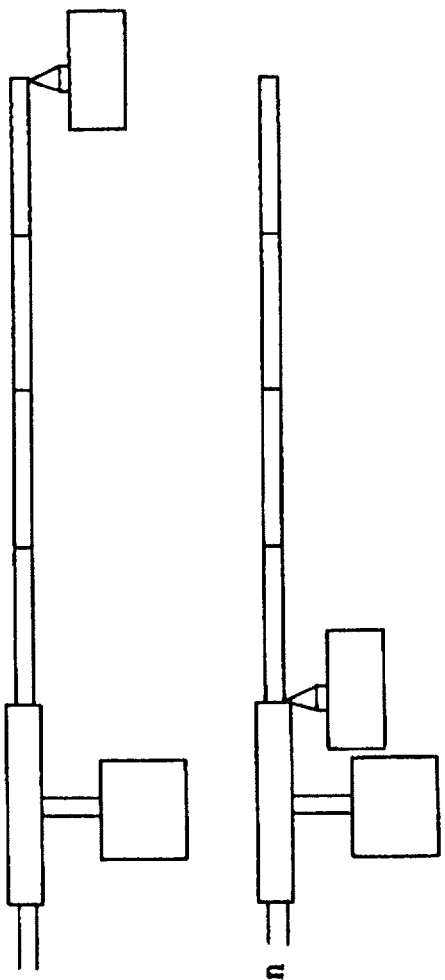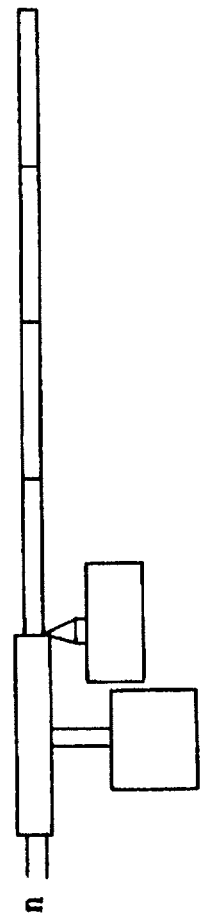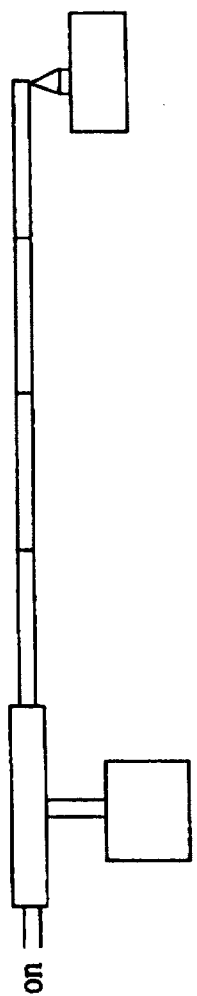
FIG. 3A PRIOR ART Land recording and reproduction Start
FIG. 3B PRIOR ART Land recording and reproduction End
FIG. 3C PRIOR ART Groove recording and reproduction Start
FIG. 3D PRIOR ART Groove recording and reproduction End

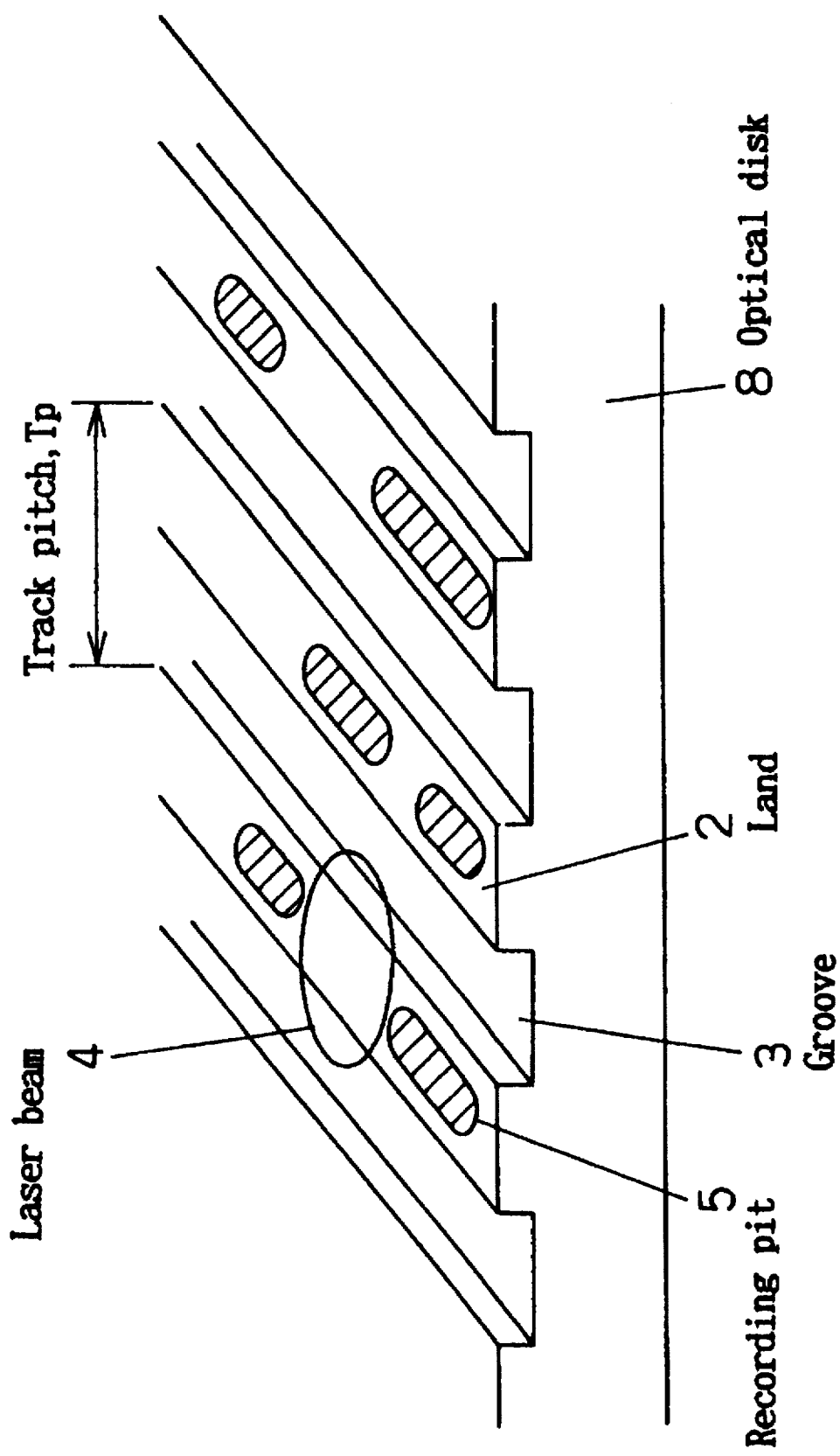

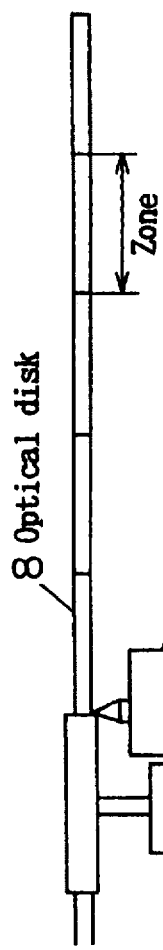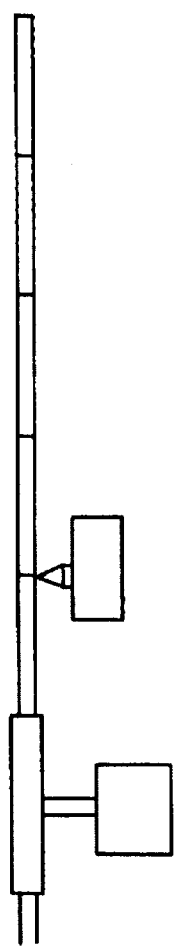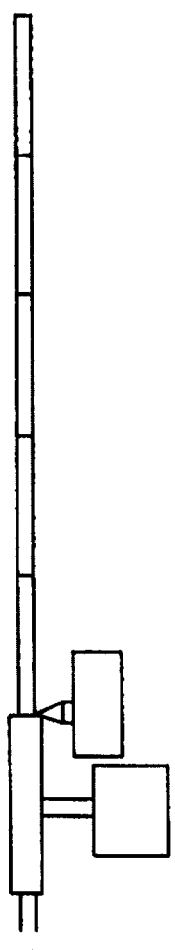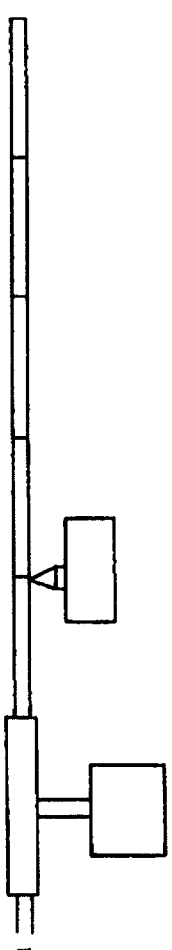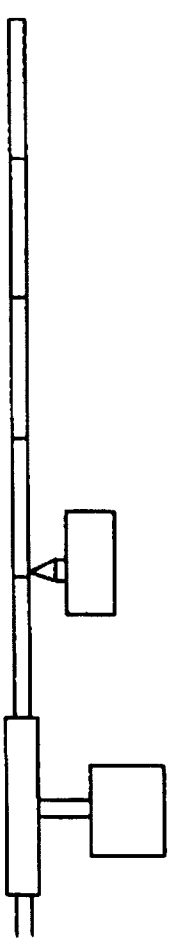
FIG. 9A Land recording and reproduction Start
FIG. 9B Land recording and reproduction End
FIG. 9C Groove recording and reproduction Start
FIG. 9D Groove recording and reproduction End
FIG. 9E Land recording and reproduction Start

OPTICAL-DISK RECORDING AND REPRODUCING APPARATUS AND METHOD USING AN OPTICAL DISK FOR RECORDING INFORMATION ON LANDS AND GROOVES

This application is a division of application Ser. No. 08/299,606, filed Sep. 1, 1994, (status:pending).

BACKGROUND OF THE INVENTION

1. Field of the Invention

The present invention relates to an optical-disk recording and reproducing apparatus and an optical disk for recording, erasing, and reproducing information.

2. Description of the Prior Art

In recent years, the optical-disk recording and reproducing apparatus has been under vigorous development by various manufacturers as a large-capacity, high-transfer-rate storage device. As a means for implementing still higher capacity, there has been put into development a system in which information is recorded in lands and grooves of tracks of the optical disk or in which the track pitch of the optical disk is narrowed.

Hereinbelow, an example of the conventional optical-disk recording and reproducing apparatus and optical disk is described with reference to the accompanying drawings.

Recording formats for land and groove recording optical disks have been published in "Narrowed track using land and groove recording in phase change optical disks" (Miyagawa et al., 1993 Spring Congress of the Electronic Communication Society), and "Discussion on land and groove recording in phase change optical disks" (Ono et al., Proceedings of 1993 Spring Congress of the Applied Physics Society).

First described is a conventional example of the land and groove recording optical disks.

FIG. 1 shows a perspective view of structural cross section of a conventional land and groove recording optical disk 1.

In FIG. 1, there are shown the land and groove recording optical disk 1, a land 2, and a groove 3. Further shown are a converged laser beam 4 and a recording pit 5.

The land and groove recording optical disk shown in FIG. 1 has had a problem that widths of the land 2 and the groove 3 are so narrow with respect to the diameter of the laser beam 4 that when information is recorded or erased on the land 2 or the groove 3, the relevant pit 5 is adjacently erased with the result of deteriorated signal quality.

Here described is region division of an optical disk in MD-DOS, which is a kind of OS (Operating System) for computers. In MS-DOS, the region of the optical disk is divided into three regions, an FAT (File Allocation Table) region, a root directory region, and a data region, as shown in FIG. 2.

The FAT region is a region for managing which sectors on the disk are used by files or directories or how the disk is used, for example, how the sectors are connected. The root directory region manages file names and directory names and their related information. The data region is a region on which the user actually records files and sub-directories. Division positions and start and end positions for the three regions are previously determined at the time of activation of MS-DOS, where especially the FAT and root directory regions are limited in their recording regions. Accordingly, the FAT and root directory regions continuously perform recording and reproduction of information. Hereinafter, the FAT and root directory regions are referred to generically as a file management region.

Since the file management region is a region for recording and reproducing file management information among the optical disk regions as described above, the file management region will be rewritten more frequently than the data region. Also, since the file management region continuously performs recording and reproduction of information, influences of neighbor erasure could not be neglected. Accordingly, more measures would be required for neighbor erasure than the data region.

With reference to FIG. 3, described is the operation of the optical disk effected when information is recorded or reproduced on the conventional land and groove recording optical disk.

Referring to FIG. 3, there are shown an optical disk 1 of land and groove recording, a spindle motor 47, and an optical head 48.

As the recording format of optical disks, available are the CLV (Constant Linear Velocity) format and the CAV (Constant Angular Velocity) format. Also available as ones taking their advantages are the MCLV (Modified Constant Linear Velocity) format and the MCAV (Modified Constant Angular Velocity) format. Among these formats, the MCLV format is one which takes an advantage that the CLV format has a large recording capacity and yet which is modified so as to simplify the varying-speed control of the spindle motor. Accordingly, in the MCLV format, the region is divided into several zones by every some plurality of radial tracks and the number of rotations is varied for each zone, so that the recording density is increased. For the example of FIG. 3, an optical disk of the MCLV format is described. The various types of recording formats are described in detail in Recording Format ("Optical Disk Technique" by Ogami et al., pp. 222–223).

As shown in FIG. 3, recording or reproduction of information is performed from inner circumferential side toward outer circumferential side independently of the zones. First, information is recorded or reproduced on the land. The optical head, when having reached the outermost circumference of the optical disk, is moved to the innermost circumference, and then the information is recorded or reproduced on the groove. In the above operation, each time the zone has changed, the number of rotations of the optical disk is changed and thereafter information recording or reproduction is performed, so that a considerable wait time is required until the operation of recording and reproduction is completed. Further, when the optical head moves from the outermost circumference to the inner most circumference, the difference between the number of zones of the innermost circumference and that of the outermost circumference is so large that long time is required until the number of rotations is stabilized, as a problem. The above problems are also involved in the CLV format as well as in the MCLV format.

Next described is the conventional land recording optical disk.

FIG. 4 is a perspective view of structural cross section showing the structure of the optical disk 1 of conventional land recording.

In FIG. 4 there are shown a land-recording optical disk 39, a land 6, and a groove 7. Further shown are a laser beam 4 and a recording pit 5.

The groove of the optical disk 1 has a shape for 3.5- and 5-inch optical disks. For example, the track format of 5-inch magneto-optical disks is standardized by JIS 130 mm rewritable optical disk cartridge (JIS×6271). The track pitch is 1.6 µm. FIG. 5 is a graph showing the relation between numerical aperture NA of the objective lens and laser beam diameter. JIS standards for 5- and 3.5-inch magneto-optical disks specify that the laser wavelength is 825 nm or 780 nm, and that the numerical aperture NA of the objective lens is 0.53. In these conditions, a diameter R of a laser beam whose light intensity is more than 1/(e*e), where e is the exponential function, can be expressed by the following equation:

$R=0.82\times\lambda/NA$ (µm)

In the standards for 5- and 3.5-inch magneto-optical disks, the laser beam diameter R is 1.2 to 1.3 µm, small as compared with the track pitch 1.6 µm, and the groove is V-shaped. Accordingly, there will not occur the problem of neighbor erasure that information of neighboring tracks is erased when continuous erasure of recorded information is being effected.

However, there has been a problem that when the track pitch is narrowed for implementation of high-density recording, that is, when the track pitch becomes smaller than the diameter of the laser beam 4 as shown in the perspective view of structural cross section showing the structure of the land-recording optical disk, there may occur quality deterioration of information due to neighbor erasure involved in continuous erasure of recorded information.

The above operation of recording and reproduction is the same with the file management region (FAT and root directory regions) and the data region of the optical disk. The deterioration due to neighbor erasure at the time of continuous erasure of recorded information becomes noticeable particularly in the file management region.

SUMMARY OF THE INVENTION

An object of the present invention is to provide an optical-disk recording and reproducing apparatus or optical disk which is prevented in the file management region of the optical disk from any influences of neighbor erasure.

Another object of the present invention is to provide an optical-disk recording and reproducing apparatus and an optical disk which can shorten the time for recording and reproduction and also increase the recording density by performing recording and reproduction for each zone when the recording format of the optical disk is MCLV or MCAV, while performing recording and reproduction for each particular number of tracks when the recording format is CLV or CAV.

To solve the problems of the conventional counterpart, the optical-disk recording and reproducing apparatus of the present invention comprises an optical disk, a spindle motor, an optical head, a reproduction circuit, a recording circuit, a servo circuit, a detector circuit, and a controller.

The optical-disk recording and reproducing apparatus and the optical disk of the present invention is capable of preventing neighbor erasure in some region, for example, the file management region and providing high density in the data region, by recording and reproducing information on only either lands or grooves in the region where file management information is recorded and reproduced, and by recording and reproducing information on both lands and grooves in the data region, in the case of land and groove recording optical disks.

According to the present invention, it is also possible for a land and groove recording optical disk to reduce the recording and reproduction time by recording and reproduction of information on lands or grooves alternately for each zone in the case of the MCLV and MCAV formats, and by so doing for each particular number of tracks in the case of the CLV and CAV formats.

According to the present invention, it is also possible for a land recording optical disk to prevent neighbor erasure in the file management region and provide a high density data region, by recording and reproducing information for every one track in the region where file management information is recorded and reproduced, and by recording and reproducing information continuously in the data region.

According to the present invention, it is still also possible for an optical disk to prevent neighbor erasure in the file management region and provide a high density data region, by making the track pitch of some region, for example, the region where file management information is recorded and reproduced, wider than the diameter of the laser beam, and by making the track pitch of the data region narrower than the diameter of the laser beam.

BRIEF DESCRIPTION OF THE DRAWINGS

FIGS. 3(a)–3(d) represent an explanatory view for the operation of recording and reproduction of the conventional land and groove recording;

FIG. 8 is a perspective view of structural cross section of the file management region of a land and groove recording optical disk 8 according to the first embodiment;

FIGS. 9(a)–9(e) represent an operation explanatory view of an optical head 10 at the time of recording or reproduction according to the first embodiment;

DESCRIPTION OF THE PREFERRED EMBODIMENTS

Hereinbelow, an optical-disk recording and reproducing apparatus and an optical disk according to an embodiment of the present invention is described with reference to the accompanying drawings.

(First embodiment)

The first embodiment relates to the optical disk 8 in which information is recorded and reproduced on both lands and grooves, the optical disk 8 having zones classified according to the MCLV recording format.

Figure 1:
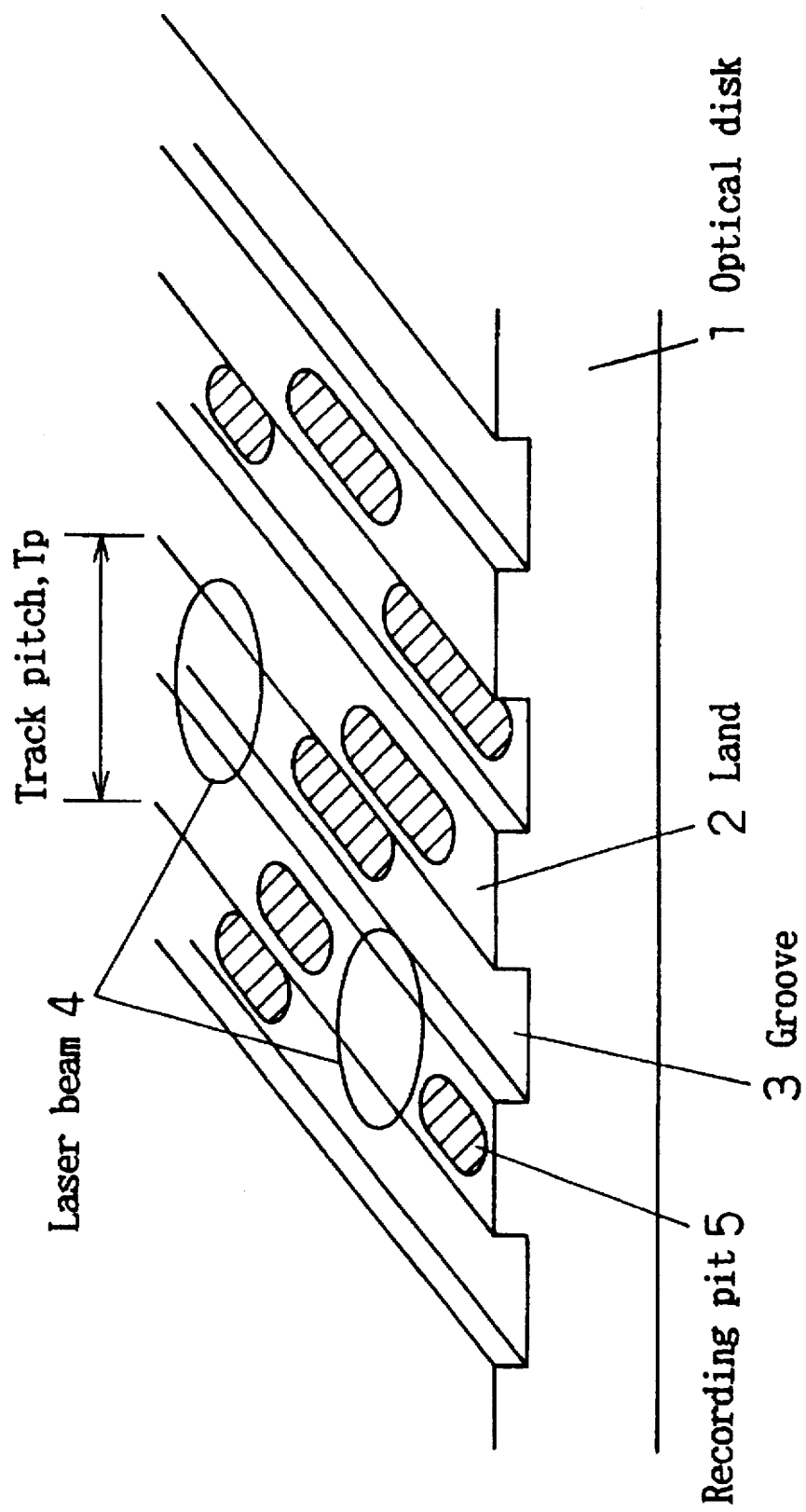
FIG. 1 is a perspective view of structural cross section of a conventional land and groove recording optical disk 1.
Figure 2:
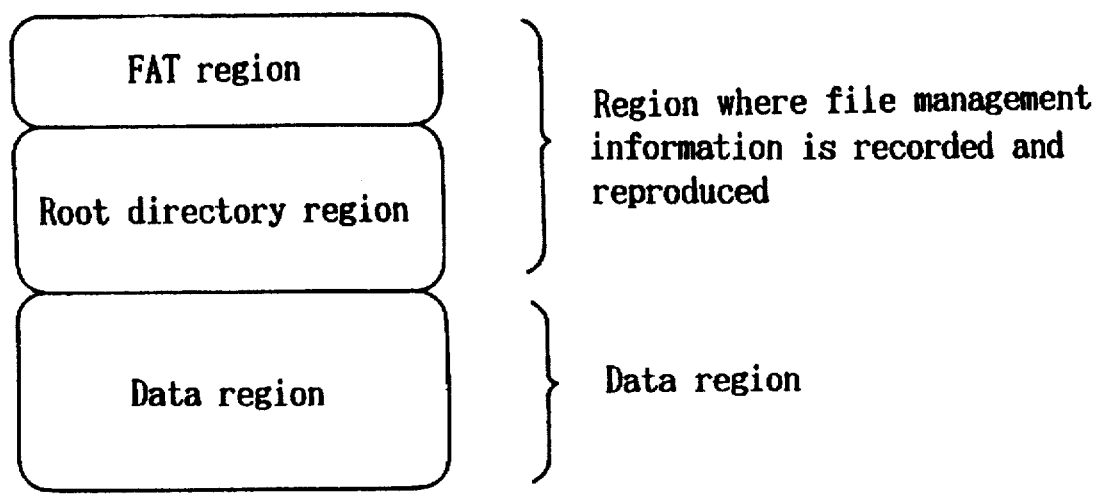
FIG. 2 is an explanatory view for explaining regions of the optical disk.
Figure 4:
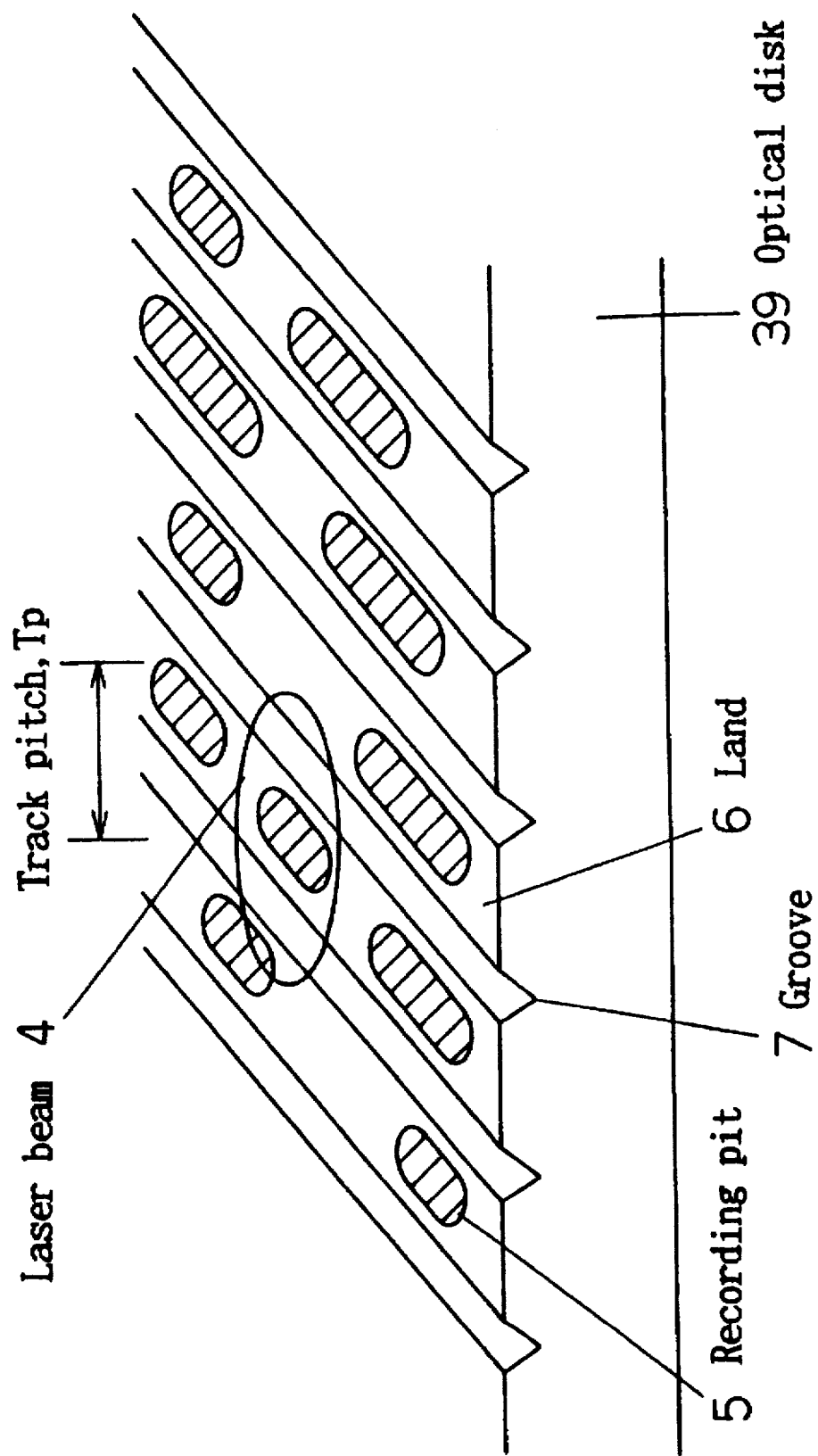
FIG. 4 is a perspective view of structural cross section of a conventional land-recording optical disk 39.
Figure 5:
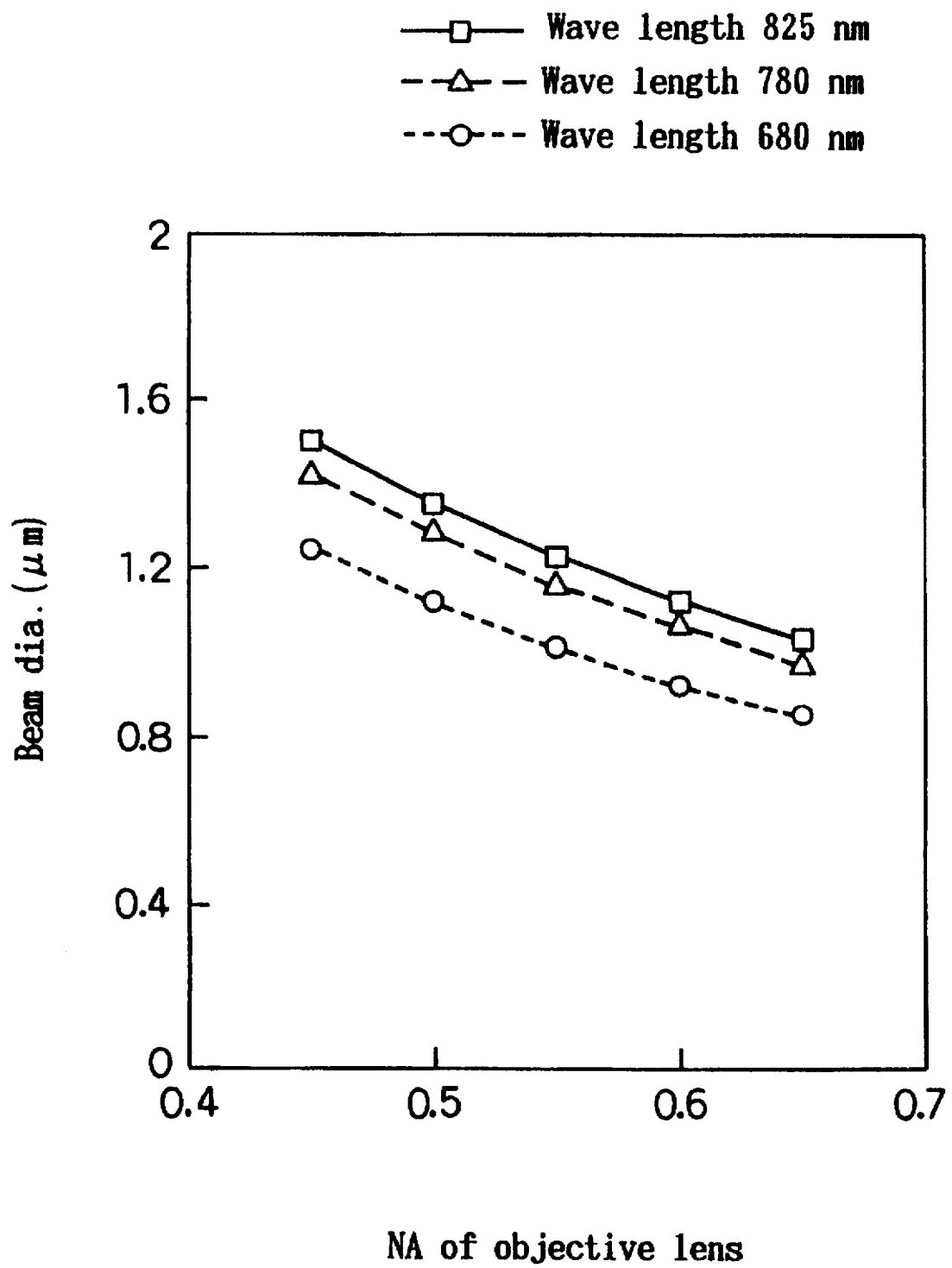
FIG. 5 is a view of the relation between numerical aperture NA of the object lens and laser beam diameter.
Figure 6:
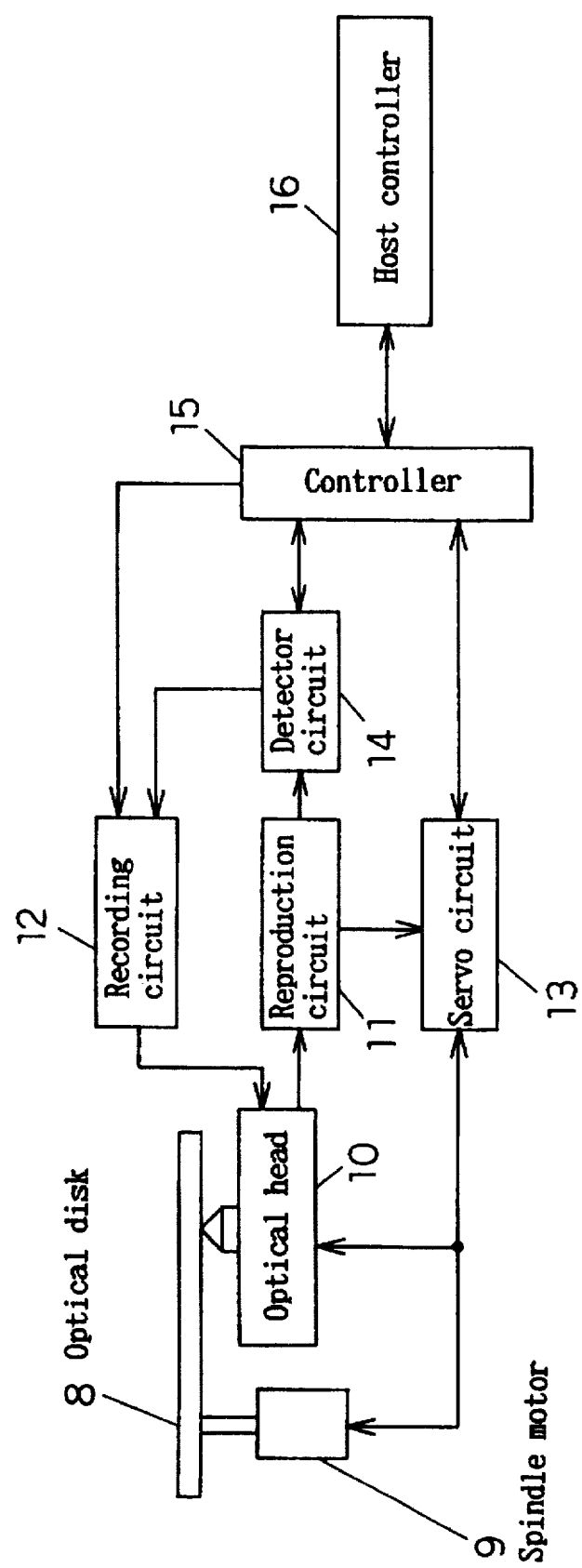
FIG. 6 is a block diagram of an optical-disk recording and reproducing apparatus according to an embodiment of the present invention.

FIG. 6 shows a block diagram of an optical-disk recording and reproducing apparatus according to the first embodiment of the present invention.

In FIG. 6, there are shown an optical disk 8, a spindle motor 9, and an optical head 10 for recording and reproducing information on the optical disk 8. The optical head 10 comprises laser, an objective lens, a collimator lens, an actuator, a transfer plate, and the like. A reproduction circuit 11 reproduces a signal outputted from the optical head 10. A recording circuit 12 fires laser of the optical head 10 into recording power and reproducing power. A servo circuit 13 controls the spindle motor 9 and the optical head 10 by using the signal of the reproduction circuit 11. A detector circuit 14 detects information recorded on the optical disk 8 from the signal of the reproduction circuit 11. A controller 15 controls the reproduction circuit 11, the recording circuit 12, the servo circuit 13, and the detector circuit 14. A host controller 16 performs exchange of information and instructions with the controller 15. A positive integer M denotes the number of tracks of the optical disk 8. A positive integer N denotes the number of sectors in each track of the optical disk 8. An identifier j, which has previously been recorded in the optical disk 8, is a logical value representing a region where file management information is recorded and reproduced. The logical value is "1" when the lands serve to record and reproduce information in the file management region, and "0" when grooves serve the same. An identifier k is a logical value showing whether lands or grooves are recorded and reproduced in the case where the data region is the region to be recorded and reproduced. The logical value of the identifier k is "1" for lands, and "0" for grooves. The identifier k is read in at the time when the optical disk 8 is activated. The present embodiment is exemplified in this description by a case where the identifier j is a logical value of "1," which corresponds to lands.

Figure 7A:
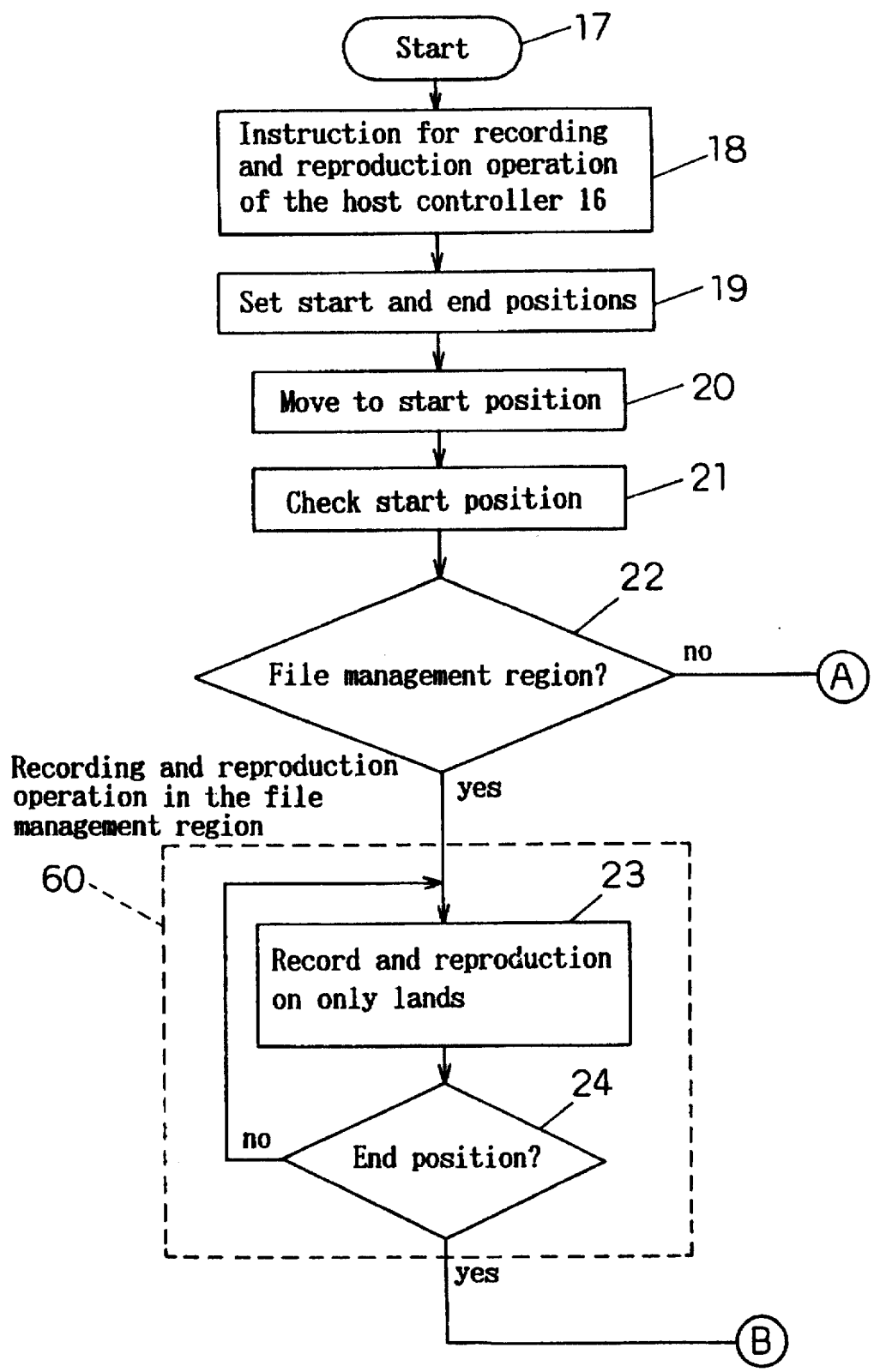
FIGS. 7A, 7B are a flow chart for recording and reproduction of a controller 15 according to the first embodiment.
Figure 7B:
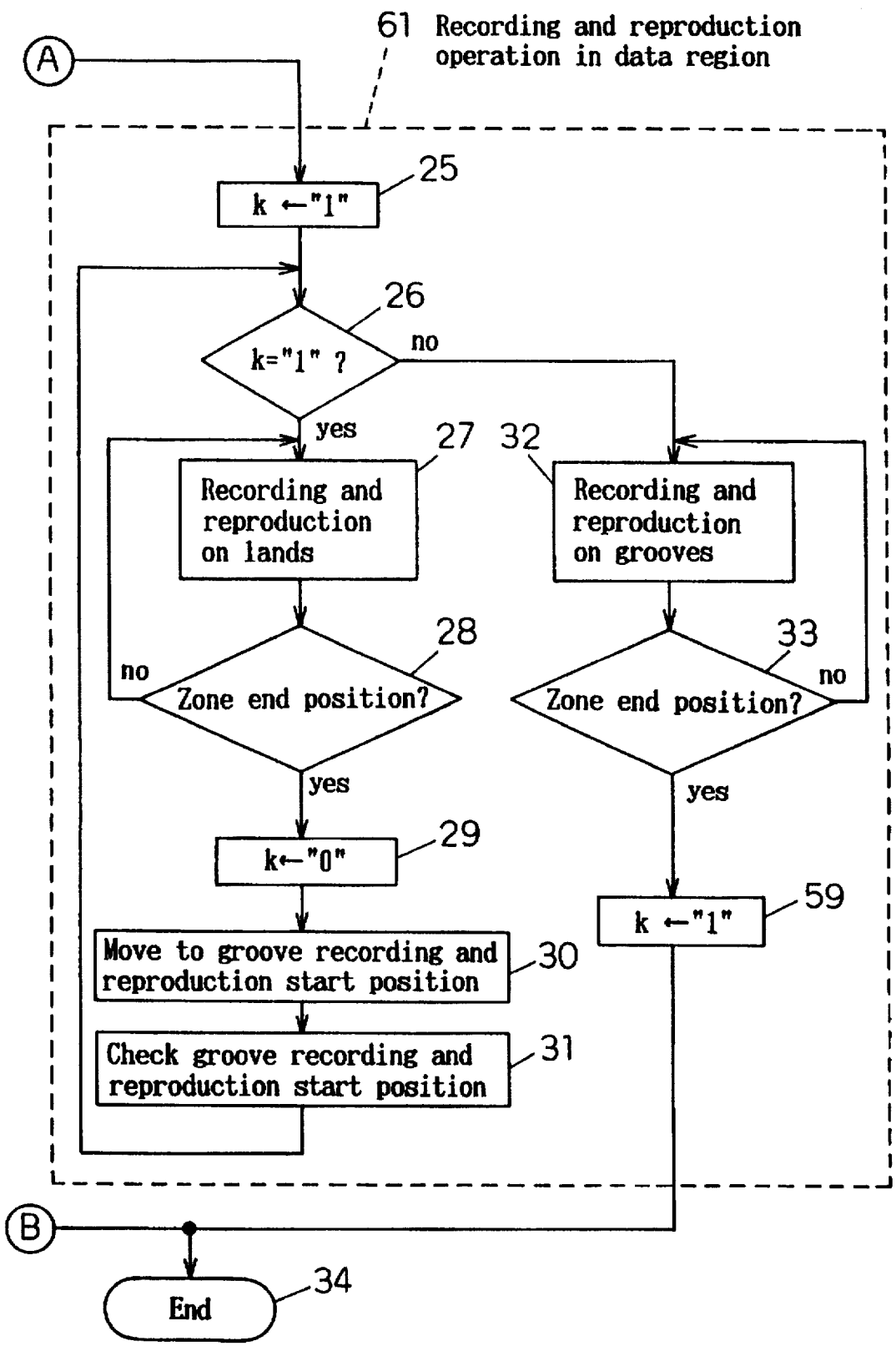

FIGS. 7A, 7B are a flow chart of the controller 15 for the operation that the optical-disk recording and reproducing apparatus according to the first embodiment of the present invention performs recording and reproduction of information.

Referring to FIGS. 7A, 7B, a start 17 is the start of the flow chart. An instruction 18 is the instruction for recording and reproduction operation of the host controller 16. A process 19 is the process of setting start and end positions for performing recording and reproduction. A process 20 is the process of moving to a start position where recording and reproduction is performed. A process 21 is the process of checking the start position where recording and reproduction is performed. A process 22 is the process of deciding whether or not the start position where recording and reproduction is performed is the file management region. The decision process 22 is connected to a process 23 of recording and reproducing information on only lands by the identifier j read in at the time of activation when the start position is the file management region, while the decision process 22 is connected to a process 25 of entering a logical value "1," which corresponds to recording and reproduction on lands, to the identifier k when the target position is the data region. An operation 60 of recording and reproduction on the file management region comprises the process 23 and a process 24. The process 23 is a process of performing recording and reproduction on only lands in the file management region. The process 24 is a process of deciding whether or not recording and reproduction on the file management region is completed up to the end position. An operation 61, which is an operation of recording and reproducing information in the data region, comprises processes 25 through 33 and a process 59. The process 25 is a process of entering a logical value "1," which shows that recording and reproduction on lands is performed, to the identifier k. The process 26 is a decision process of deciding whether the logical value of the identifier k is "1" or "0." The decision process 26 is connected to a land recording and reproduction process 27 when the identifier k is a logical value "1," i.e., when the lands are recorded and reproduced, while the decision process 26 is connected to a groove recording and reproduction process 32 when the identifier k is a logical value "0," i.e., when the grooves are recorded and reproduced. The process 27 is a process of recording and reproducing information on lands in the data region. A process 28 is a decision process of deciding whether or not the land recording and reproduction process has been completed up to the zone end position. The decision process 28 is connected to a process 29 of entering a logical value "0" to the identifier k when the position where the land recording and reproduction process 27 has been completed is the zone end position, while the decision process 28 is connected to the land recording and reproduction process 27 when the position where the land recording and reproduction process 27 has been completed is not the zone end position. A process 29 is the process of entering a logical value "0," which makes grooves the recorded and reproduced region, to the identifier k. A process 30 is the process of moving the groove recording and reproduction start position. A process 31 is the process of checking the start position for groove recording and reproduction. A process 32 is the process of recording and reproducing data on grooves. A process 33 is the process of deciding whether or not the position where the groove recording and reproduction process 32 has been completed is the zone end position. The decision process 33 is connected to the process 59 of entering a logical value "1" to the identifier k when the position where the recording and reproduction process 32 has been completed is the zone end position, while the decision process 33 is connected to the groove recording and reproduction process 32 when the position where the recording and reproduction process 32 has been completed is not the zone end position. The process 59 is a process of entering a logical value "1" to the identifier k. The end 34 shows an end of the flow chart of FIGS. 7A, 7B.

FIG. 8 is a perspective view of structural cross section of the file management region of the land and groove recording optical disk 8 according to the present embodiment.

In FIG. 8, there are shown lands 2 and grooves 3. The track is composed of the lands 2 and the grooves 3. Further shown are a converged laser beam 4 and recording pits 5.

FIG. 9 is an explanatory view for the operation of the optical head 10 in recording and reproducing information on the data region of the present embodiment.

In FIG. 9, FIG. 9A shows a position of the optical head 10 at the time when land recording and reproduction is started, and FIG. 9B shows a position of the optical head 10 at the time when land recording and reproduction is ended. FIG. 9C shows a position of the optical head 10 at the time when groove recording and reproduction is started, and FIG. 9D shows a position of the optical head 10 at the time when groove recording and reproduction is ended. FIG. 9E shows a position of the optical head 10 at the time when land recording and reproduction for the next zone is started.

With regard to the optical-disk recording and reproducing apparatus and the optical disk having the above-described arrangement, its operation is now described with reference to FIGS. 6, 7, 8, and 9.

The controller 15 reads the identifier j that shows whether it is lands or grooves on which information of the file management region of the optical disk 8 recorded on particular tracks of the optical disk 8 at the time when the optical-disk recording and reproducing apparatus is activated is recorded. The present embodiment is described on a case where the identifier j is a logical value "1," i.e., lands serve for recording and reproduction performed in a region where the file management information is recorded and reproduced.

The spindle motor 9 rotates the optical disk 8 at a constant velocity in each zone. When the zone has changed, the number of rotations of the spindle motor 9 changes. The number of rotations of the spindle motor 9 increases as the optical head 10 moves toward the outer circumference. The servo circuit 13 performs the control of the number of rotations. For reproduction of information, the laser of the optical head 10 is lit with reproducing power by the recording circuit 12. The laser light of the optical head 10 is converged by the servo circuit 13, forming the laser beam 4 on a land on the optical disk 8. The laser light is reflected by diffraction, variation in reflectivity, or Kerr effect exerted by the recording pit 5 recorded on the land 2, and the reflected light passes the optical head 10 and is outputted to the reproduction circuit 11. The reproduction circuit 11 reproduces a servo signal and an information signal from the reflected light. The servo circuit 13 controls the optical head 10 by using the servo signal of the reproduction circuit 11. The detector circuit 14 detects information recorded on the optical disk 8 by using the information signal of the reproduction circuit 11. Detected information is transferred to the controller 15, and outputted to the host controller 16. The controller 15 controls the reproduction circuit 11, the recording circuit 12, the servo circuit 13, and the detector circuit 14.

For recording of information, when the optical disk 8 is a magneto-optical disk, the recording circuit 12 fires the laser of the optical head 10 with recording power by changing the direction of magnetic field of external magnetic bias (not shown), so that information is recorded under control in compliance with a recording signal of the detector circuit 14. When the optical disk 8 is a phase change disk, the recording circuit 12 fires the laser of the optical head 10 with recording power so that information is recorded under control in compliance with a recording signal of the detector circuit 14.

Referring to FIGS. 7A, 7B upon reception of an instruction for recording and reproduction from the host controller 16, the controller 15 sets start and end positions for recording and reproduction of the optical disk 8, and checks movement to the start position and the start position. When the position where the recording and reproduction is performed is the file management region, the operation 60 of recording and reproduction in the file management region is executed. In the operation, recording and reproduction of file management information is performed in such a way that the lands of the 0th to Nth sectors of the Mth track are recorded and reproduced according to the identifier j and, for the succeeding information, the process 23 for performing recording and reproduction from the lands of the 0th sector of the (M+1)th track. In the decision process 24, it is decided whether or not the position where the recording and reproduction has been performed is the end position. If the end position has been reached, the operation of recording and reproduction is ended. If the position where the recording and reproduction has been performed has not reached the end position, the program returns to the process 23 of recording and reproducing information on only lands. By the above operation, information is recorded and reproduced on only the lands 2 in the region where the file management information is recorded and reproduced as shown in FIG. 8, so that no influences of neighbor erasure are exerted at the time of erasure of records by the laser beam 4.

Next, for recording and reproduction in the data region, the operation 61 of recording and reproduction in the data region is executed. The operation 61 of recording and reproduction in the data region is shown by the flow chart of FIG. 9. Referring to FIG. 9, for recording and reproduction in the data region, the head land of the zone is first recorded and reproduced as shown in FIG. 9A. Next, land recording and reproduction in the same zone is completed as shown in FIG. 9B and thereafter the optical head 10 is moved to the start position of the zone as shown in FIG. 9C, where recording and reproduction is performed from the head groove of the zone. After the groove recording and reproduction is completed as shown in FIG. 9D, the next zoon land is recorded and reproduced as shown in FIG. 9E. As described above, the land and groove recording within the same zone is performed and thereafter, over the movement to the next zone, the land and groove recording and reproduction is performed.

In the operation 61 of recording and reproduction in the data region in FIGS. 7A, 7B first, the identifier k is given a "1," i.e., instructed for recording and reproduction, and it is decided in the decision process 26 whether or not the land recording and reproduction should be done. Next, in the process 27 of land recording and reproduction and the decision process 28 of the zone end position, land recording and reproduction is executed within the same zone. When the position of the land recording and reproduction has reached the zone end position, an instruction is issued for the process 29 of entering a "0" to the identifier k, i.e., for groove recording and reproduction, where executed are the process 30 to movement to the start position of groove recording and reproduction and the process 31 of checking the start position. The groove recording and reproduction is decided in the decision process 26, and the groove recording and reproduction is executed within the same zone in the process 32 of groove recording and reproduction and the process 33 of deciding the zone end position.

By the operation as described above, in which land and groove recording is performed within the same zone and thereafter, over movement to the next zone, land and groove recording is performed, the moving length of the optical head 10 is short and therefore the seek time is small. Moreover, by movement within the same zone, the land and groove recording can be performed without any variation in the number of rotations of the spindle motor 9. Thus, the time required for recording and reproducing operation can be reduced.

According to the present embodiment, as described above, the identifier j of the optical disk 8 is read at the time of activation of the optical-disk recording and reproducing apparatus, and file management information is recorded and reproduced on only lands in the region of the land and groove recording optical disk 8 where the file management information is recorded and reproduced, while information is recorded and reproduced on both lands and grooves in the data region. Further, the controller 15 is provided for repeating land and groove recording and reproduction within the same zone. Thus, quality deterioration due to neighbor erasure in the file management region can be prevented, and moreover implementation of a high density data region and reduction in the recording and reproduction time are possible.

The present embodiment has been described taking the case where information is recorded on lands in the file management region. However, it may be only grooves on which information is recorded and reproduced in the file management region. Also, the present embodiment has been described on the case where the recording and reproduction in the data region is performed, starting with lands. However, it may be done starting with grooves. Further, whereas the position where the identifier j is recorded to the optical disk, for recording and reproduction of information in the file management region, has not been limited, it may be recorded in any region such as control tracks for recording optical-disk information, a test zone which has no information written therein but which is recordable. Also, although the present embodiment has been described with respect to the optical disk in which the identifier j has been recorded, yet it is possible to decide whether recording and reproduction in the file management region is performed on lands or grooves at the time of activation of the controller in the case of optical disks in which the identifier j has not been recorded. Further, although the present embodiment has been described on a case where the optical disk is in the MCLV recording format, yet similar processing is applicable to the MCAV recording format and in the CLV ,CAV similar advantages can be obtained by repeating land and groove recording and reproduction at intervals of not zones but a plurality of tracks. For example the embodiments are obtained by changing the embodiment of FIG. 7. That is, in the steps 28 and 33 the "zone end position ?" is replaced with "a plurality of tracks end position ?" and other steps are same. Furthermore, although the present embodiment has been described with the operation of recording and reproduction in the units of tracks, yet the operation may also be in the units of sectors. Still further, also in the data region, the recording format for part of files may be only either lands or grooves for prevention of deterioration due to neighbor erasure.

(Second embodiment)

A second embodiment of the present invention is now described with reference to accompanying drawings. The second embodiment is directed to an optical disk 35 in which information is recorded and reproduced on lands. In the optical disk 35, zones are classified by the MCLV recording format.

Figure 10:
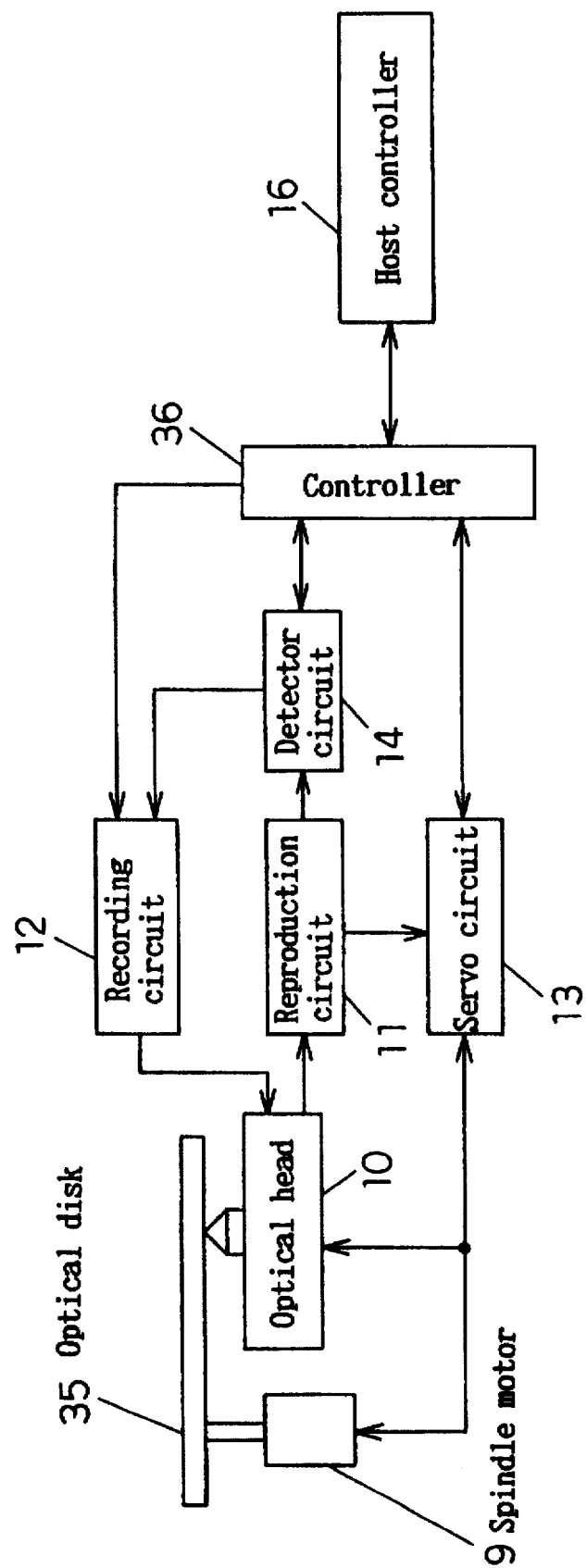
FIG. 10 is a block diagram of an optical-disk recording and reproducing apparatus according to a second embodiment of the present invention.

FIG. 10 shows a block diagram of an optical-disk recording and reproducing apparatus according to the second embodiment of the present invention.

Referring to FIG. 10, a spindle motor 9; an optical head 10 for recording and reproducing information on the optical disk 35; a reproduction circuit 11 for reproducing a signal outputted from the optical head 10; a recording circuit 12 for firing laser of the optical head 10 with recording power; a servo circuit 13 for controlling the optical head 10 by using a signal of the reproduction circuit 11; a detector circuit 14 for detecting information recorded on the optical disk 35 from the signal of the reproduction circuit 11; and a host controller 16 for performing exchange of information and instructions with a controller 36. The above arrangement is the same as in FIG. 6. The arrangement differs from FIG. 6 in that the optical disk 35 is a land-recording optical disk, and that the controller 36 controls the reproduction circuit 11, the recording circuit 12, the servo circuit 13, and the detector circuit 14 and moreover operates as in the flow chart of FIG. 11. A positive integer M denotes the number of tracks of the optical disk 35, while a positive integer N denotes the number of sectors of each track in the optical disk 35.

Figure 11:
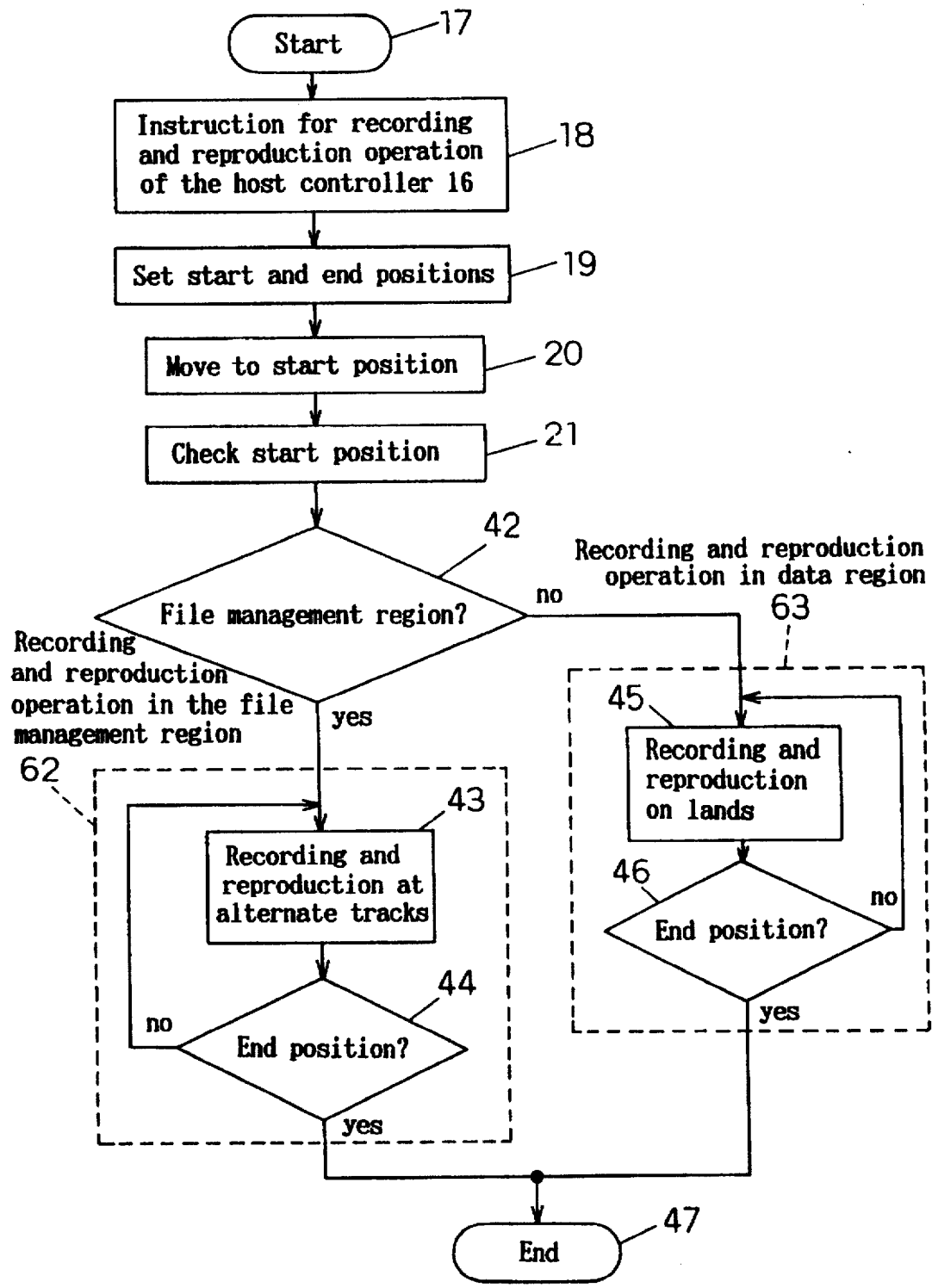
FIG. 11 is a flow chart of recording and reproduction of a controller 36 according to the second embodiment.

FIG. 11 is a flow chart showing the operation of recording and reproduction by the controller 36 of the optical-disk recording and reproducing apparatus according to the second embodiment.

Referring to FIG. 11, a start 17 is the start of the flow chart. An instruction 18 is the instruction for recording and reproduction operation of the host controller 16. A process 19 is the process of setting start and end positions for performing recording and reproduction. A process 20 is the process of moving to a start position where recording and reproduction is performed. A process 21 is the process of checking the start position where recording and reproduction is performed. The above processes are the same as in FIGS. 7A,7B. The following are different from FIGS. 7A,7B. A process 42 is the decision process of deciding whether or not the start position where recording and reproduction is performed is the file management region. The decision process 42 is connected to a process 43 of recording and reproducing information at alternate tracks when the start position is the file management region, while the decision process 42 is connected to a process 45 of continuously performing the operation of recording and reproducing information when the target position is the data region. An operation 62 of recording and reproduction on the file management region comprises the process 43 and a process 44. The process 43 is a process of performing recording and reproduction the 0th to Nth sectors of the Mth track in the file management region and, after awaiting one rotation, recording and reproducing the succeeding information from the 0th sector of the (M+2)th track, whereby recording and reproduction of information is performed at alternate tracks. The process 44 is a decision process of deciding whether or not the recording and reproduction in the file management region has been completed up to the end position. An operation 63, which is the operation of recording and reproducing information in the data region, comprises processes 45, 46. The process 45 is a process of continuously recording and reproducing information on lands in the data region by recording and reproducing the Mth track and then recording and reproducing the succeeding information at the (M+1)th track. The process 46 is a process of deciding whether or not the land recording and reproduction process 45 has been completed up to the recording and reproduction end position. The decision process 46 is connected to an end 47 when the position where the land recording and reproduction process 45 has been completed is the recording and reproduction end position, while the decision process 46 is connected to the land recording and reproduction process 45 when the position where the process 46 has been completed is not the recording and reproduction end position. The end 47 shows an end of the flow chart of FIG. 11.

Figure 12:
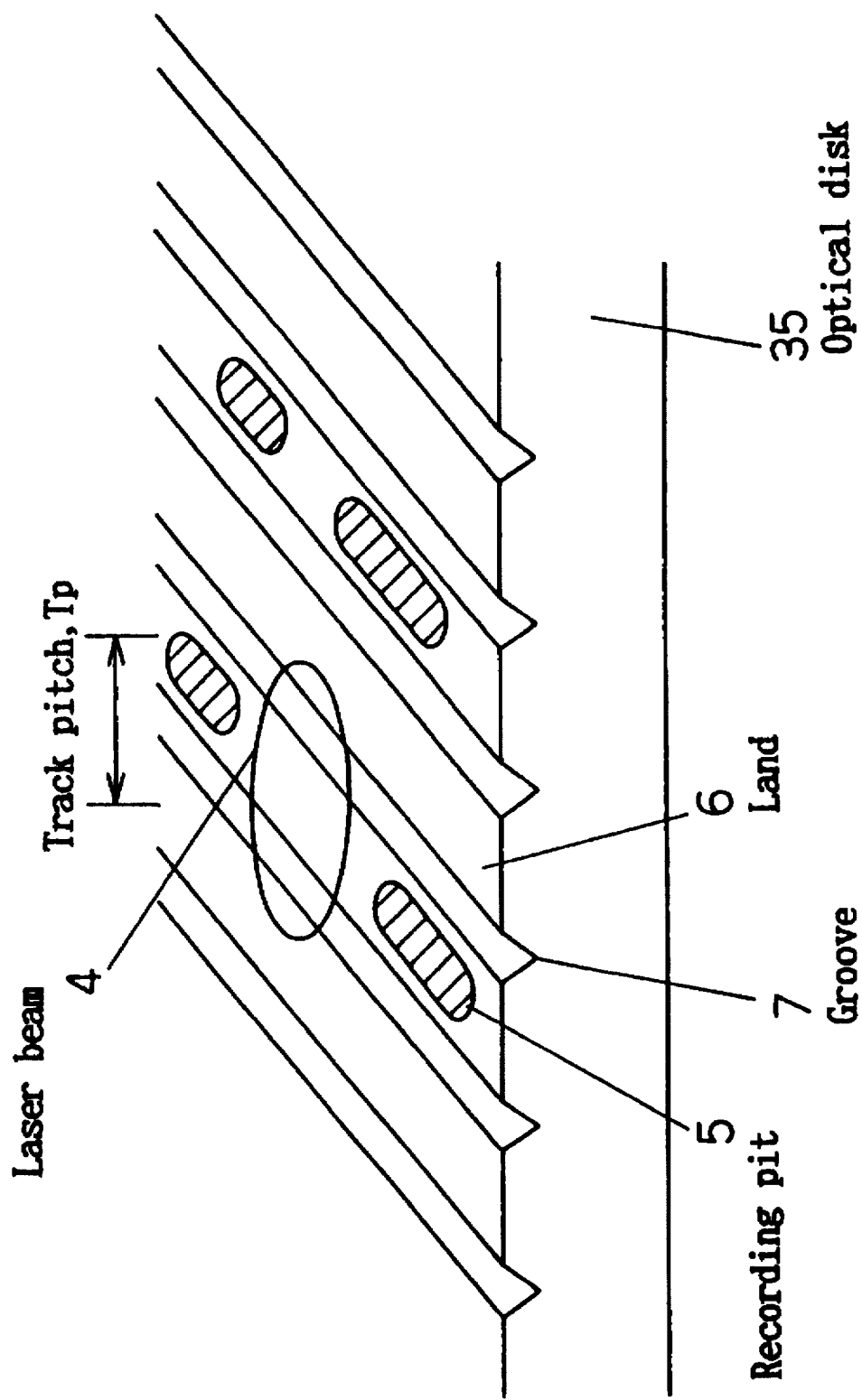
FIG. 12 is a perspective view of structural cross section of the file management region of a land-recording optical disk 35 according to the second embodiment.

FIG. 12 is a perspective view of structural cross section of the file management region of the optical disk 35 in which information is recorded on lands, according to the second embodiment.

Referring to FIG. 12, lands and grooves of the optical disk 35 are those for 3.5- and 5-inch magneto-optical disks, whereas the track pitch is smaller than 1.6 μm. In FIG. 12, there are shown a converged laser beam 4 and recording pits 5.

Components having the same functions as in the above-described first embodiment are designated by the same numerals and omitted in their description.

With respect to the optical-disk recording and reproducing apparatus having the above-described arrangement, its operation is described below.

Referring to FIG. 11, upon reception of an instruction for recording and reproduction from the host controller 16, the controller 36 sets start and end positions for recording and reproduction of the optical disk 35, and checks movement to the start position and the start position. When the position where the recording and reproduction is performed is the file management region, the operation 60 of recording and reproduction in the file management region is executed. In the operation, recording and reproduction of file management information is performed in such a way that the lands of the 0th to Nth sectors of the Mth track are recorded and reproduced and, for the succeeding information, the process 43 for performing recording and reproduction from the lands of the 0th sector of the (M+2)th track. In the decision process 44, it is decided whether or not the position where the recording and reproduction has been performed is the end position. If the end position has been reached, the operation of recording and reproduction is ended. If the position where the recording and reproduction has been performed has not reached the end position, the program returns to the process 43 of recording and reproduction at alternate tracks. By the above operation, information is recorded and reproduced at alternate tracks in the region where the file management information is recorded and reproduced as shown in FIG. 12, so that no influences of neighbor erasure are exerted at the time of erasure of records by the laser beam 4.

For recording and reproduction in the data region, the controller 36 executes the operation 63 of recording and reproduction in the data region. In the operation 63 of recording and reproduction in the data region, the Mth track is first recorded and reproduced by the land recording and reproduction process 45 and, when the recording and reproduction position has been decided not to be the end position in the decision process 46, the succeeding information is recorded and reproduced at the (M+1)th track, whereby information is continuously recorded. When the recording and reproduction position has been decided to be the end position, the operation is ended.

As described above, according to the present embodiment, such a controller 36 is provided that information is recorded and reproduced at alternate tracks in the file management region of the optical disk 35, while information is continuously recorded and reproduced, whereby quality deterioration due to neighbor erasure of the file management information can be prevented and a high-density data region can be implemented.

Although the present embodiment has been described with reference to an optical disk in which information is recorded and reproduced on lands, the invention may also be applied to optical disks in which information is recorded and reproduced on grooves. Further, although the present embodiment has been described on a case where the optical disk is in the MCLV recording format, yet similar advantages can be also obtained with other formats (CLV, CAV, MCAV). Furthermore, the operation of recording and reproduction has been described in the units of tracks, the operation may also be performed in the units of sectors. Still further, for prevention of any deterioration due to neighbor erasure in the data region, recording and reproduction of part of files may be done at alternate tracks.

(Third embodiment)

Now a third embodiment of the present invention is described with reference to the accompanying drawings. The third embodiment is directed to a recording format of an optical disk 37 in which information is recorded and reproduced on only lands.

Figure 13:
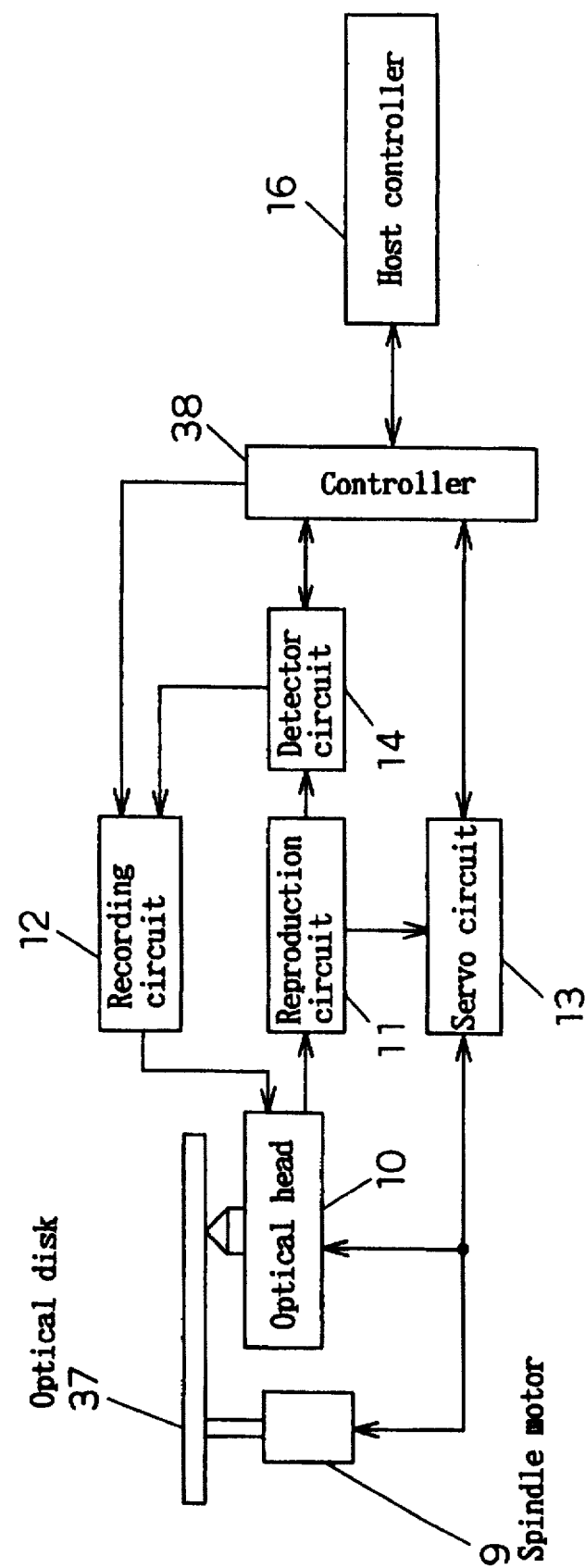
FIG. 13 is a block diagram of an optical-disk recording and reproducing apparatus according to a third embodiment of the present invention.
Figure 14:
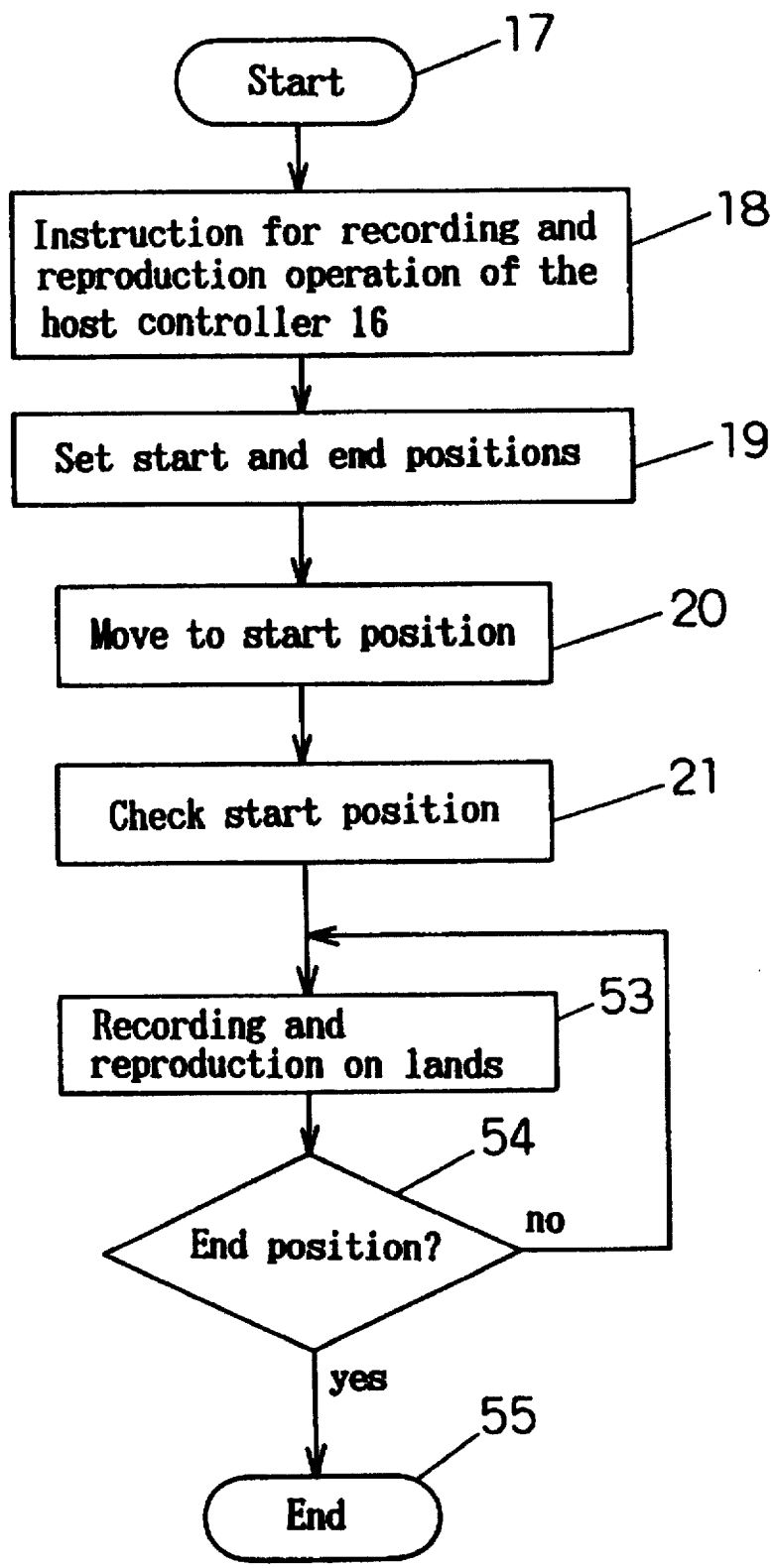
FIG. 14 is a flow chart for recording and reproduction of a controller 38 according to the third embodiment of the present invention.

Referring to FIG. 13, there are shown a spindle motor 9; an optical head 10 for recording and reproducing information on the optical disk 37; a reproduction circuit 11 for reproducing a signal outputted from the optical head 10; a recording circuit 12 for firing laser of the optical head 10 with recording power; a servo circuit 13 for controlling the optical head 10 by using a signal of the reproduction circuit 11; a detector circuit 14 for detecting information recorded on the optical disk 37 from the signal of the reproduction circuit 11; and a host controller 16 for performing exchange of information and instructions with a controller 38. The above arrangement is the same as in FIG. 10. The arrangement differs from FIG. 10 in that the optical disk 37 is a land-recording optical disk, that the track pitch of the region where the file management information is recorded and reproduced is made wider than the laser beam diameter, and that the controller 38 operates according to the flow chart as shown in FIG. 14. A positive integer M denotes the number of tracks of the optical disk 37, while a positive integer N denotes the number of sectors of each track in the optical disk 37.

FIG. 14 is a flow chart showing the operation of recording and reproduction by the controller 38 of the optical-disk recording and reproducing apparatus according to the third embodiment.

Referring to FIG. 14, a start 17 is the start of the flow chart. An instruction 18 is the instruction for recording and reproduction operation of the host controller 16. A process 19 is the process of setting start and end positions for performing recording and reproduction. A process 20 is the process of moving to a start position where recording and reproduction is performed. A process 21 is the process of checking the start position where recording and reproduction is performed. The above processes are the same as in FIG. 11. The following are different from FIG. 11. A process 53 is the process of continuously recording and reproducing information on lands by first recording and reproducing the Mth track and then, for the succeeding information, recording and reproducing the (M+1)th track. A process 54 is the process of deciding whether or not the recording and reproduction position for the land recording and reproduction process 53 has reached the recording and reproduction end position. The decision process 54 is connected to an end 55 when the position where the land recording and reproduction process 55 has been completed is the recording and reproduction end position, while the decision process 54 is connected to the land recording and reproduction process 53 when the position where the process 53 has been completed is not the recording and reproduction end position. The end 55 shows an end of the flow chart of FIG. 14.

Figure 15:
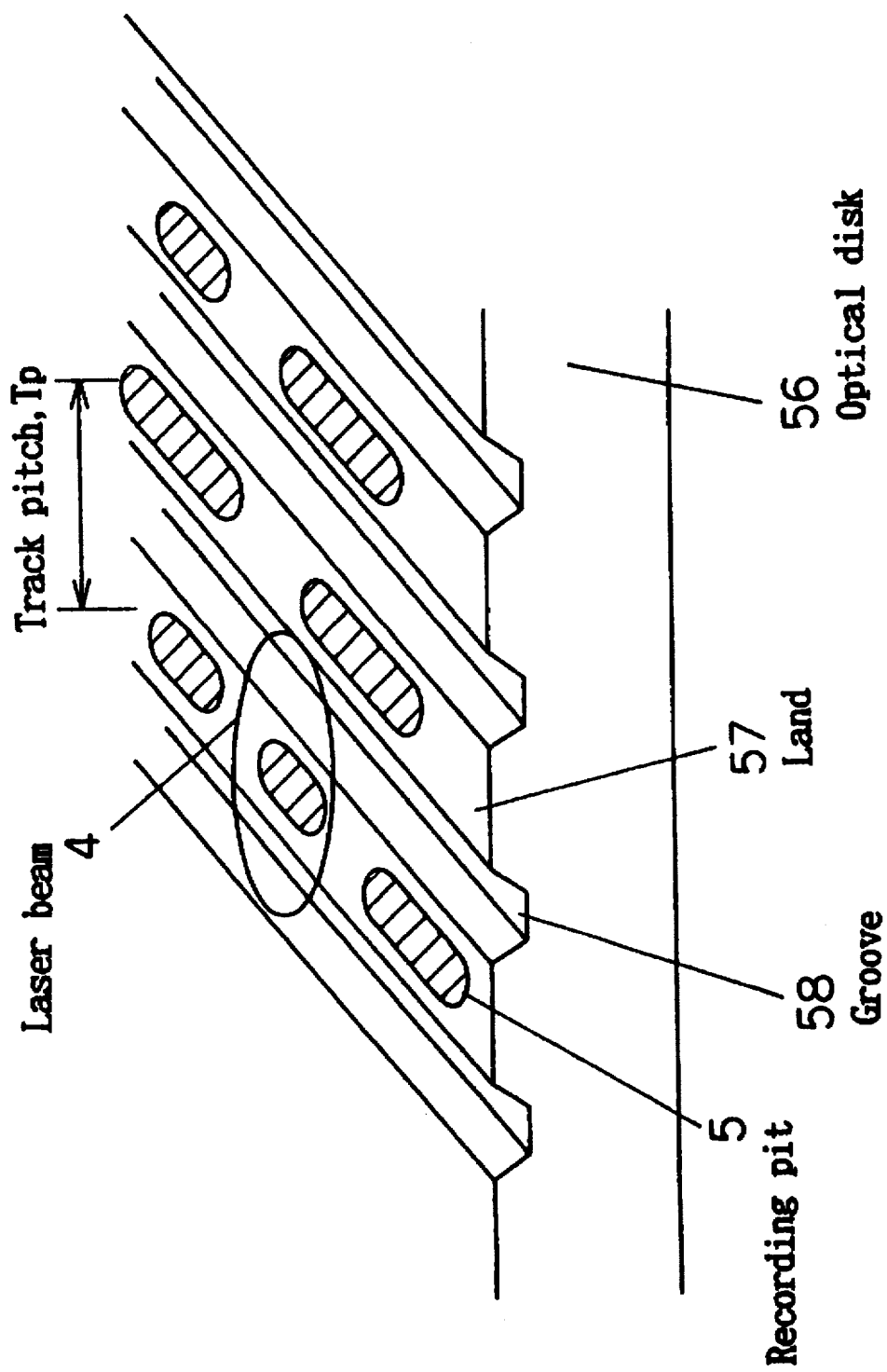
FIG. 15 is a perspective view of structural cross section of the file management region of a land-recording optical disk 37 according to the third embodiment.

FIG. 15 is a perspective view of structural cross section of the file management region of the optical disk 37 in which information is recorded on lands, according to the third embodiment.

Referring to FIG. 15, there are shown a converged laser beam 4 and recording pits 5. The arrangement differs from FIG. 12 in that a groove 58 is made larger in width in the file management region, that the track pitch of tracks formed by lands 57 and grooves 58 is made wider than the diameter of the laser beam 4, and that the track pitch in the data region is made narrower than the diameter of the laser beam 4 as shown in FIG. 12.

With regard to the optical-disk recording and reproducing apparatus having the above-described arrangement, its operation is described below.

Referring to FIG. 14, upon reception of an instruction for recording and reproduction from the host controller 16, the controller 38 determines start the target position of the optical disk 37, and checks movement to the target position and the target position to execute the recording and reproduction of information. In the present embodiment, the controller 38 does not perform the decision process of region. In both the file management region and the data region, the Mth track is first recorded and reproduced by the land recording and reproduction process 53, and when the recording and reproduction position has been decided not to be the end position by the decision process 54, the succeeding information is recorded and reproduced at the (M+1)th track, whereby information is continuously recorded. When the recording and reproduction position has been decided to be the end position, the operation is ended.

As shown in FIG. 15, the optical disk of the present embodiment is so arranged that the groove 58 in the region where the file management information of the land-recording optical disk 37 is recorded and reproduced is made larger in width, that the track pitch of tracks formed by lands 57 and grooves 58 is made wider than the diameter of the laser beam 4, and that the track pitch of tracks in the data region is made narrower than the diameter of the laser beam 4. Thus, any deterioration due to neighbor erasure at the time of erasing records of adjacent tracks in the region where the file management information is recorded and reproduced can be prevented, and moreover a high-density data region can be implemented.

As described above, according to the present embodiment, any quality deterioration due to neighbor erasure in the region where the file management information is recorded and reproduced, by virtue of the arrangement that the track pitch in the region where the file management information of the land-recording optical disk is recorded and reproduced is made larger in width than the diameter of the laser beam. Moreover, a high-density data region can be implemented by virtue of the arrangement that the track pitch in the data region is made larger in width than the diameter of the laser beam.

The present embodiment has been described on a case where information is recorded and reproduced on lands in the region where the file management information is recorded and reproduced and/or in the data region. However, it may also be grooves in the region on which the file management information is recorded and reproduced and/or in the data region. Further, for prevention of any deterioration due to neighbor erasure also in the data region, it is allowed that the track pitch in some region is made wider than the diameter of the laser beam. Still further, although the recording format of the optical disk has not been mentioned, similar advantages can be obtained with any one of the formats CLV, CAV, MCAV, and MCLV.

What is claimed is:

1. An optical-disk recording and reproducing apparatus using an optical disk in which information is recorded on lands and grooves and which is in a zone recording format, the apparatus comprising:

an optical head for applying laser light to the optical disk to yield an output of its reflected light;

a recording circuit for controlling the laser light of the optical head;

a reproduction circuit for reproducing the output of the optical head;

a detector circuit for detecting a signal recorded on the optical disk from a signal of the reproduction circuit;

a servo circuit for applying servo by using the signal of the reproduction circuit; and a controller for controlling the servo circuit by using a signal of the detector circuit, wherein the controller performs such control that information is reproduced on a land and a groove for a first zone, prior to information being reproduced on a land and a groove for a second zone.

2. The optical-disk recording and reproducing apparatus using an optical disk in which information is recorded on lands and grooves and which is in a zone recording format according to claim 1, wherein said controller controls said servo circuit such that after information has been recorded and reproduced on lands in a zone, information is recorded and reproduced on grooves in the zone.

3. The optical-disk recording and reproducing apparatus using an optical disk in which information is recorded on lands and grooves and which is in a zone recording format according to claim 1, wherein said controller controls said servo circuit such that after information has been recorded and reproduced on grooves in a zone, information is recorded and reproduced on lands in the zone.

4. The optical-disk recording and reproducing apparatus using an optical disk in which information is recorded on lands and grooves and which is in a zone recording format according to claim 1, wherein the optical head traces the land and the groove of only the first zone prior to information being reproduced on the land and the groove of the second zone.

5. A method for optical-disk recording and reproducing using an optical disk in which information is recorded on lands and grooves and which is in a zone recording format, comprising the steps of:

applying laser light to the optical disk using an optical head to generate an output of the reflected light from the optical disk;

controlling the laser light of the optical head using a recording circuit;

reproducing the output of the optical head using a reproduction circuit;

detecting a signal from the reproduction circuit recorded on the optical disk using a detector circuit;

applying servo by using the signal of the reproduction circuit using a servo circuit; and controlling the servo circuit by using a signal of the detector circuit such that information is reproduced on a land and a groove for a first zone, prior to information being reproduced on a land and a groove for a second zone.

6. The method for optical-disk recording and reproducing using an optical disk in which information is recorded on lands and grooves and which is in a zone recording format according to claim 5, wherein the step of controlling controls said servo circuit such that after information has been recorded and reproduced on lands in a zone, information is recorded and reproduced on grooves in the zone.

7. The method for optical-disk recording and reproducing using an optical disk in which information is recorded on lands and grooves and which is in a zone recording format according to claim 5, wherein the step of controlling controls said servo circuit such that after information has been recorded and reproduced on grooves in a zone, information is recorded and reproduced on lands in the zone.

8. The method for optical-disk recording and reproducing using an optical disk in which information is recorded on lands and grooves and which is in a zone recording format according to claim 5, wherein the step of applying laser light includes a step of tracing the land and the groove of only the first zone using the optical head prior to information being reproduced on the land and the groove of the second zone.

* * * * *